United States Patent [19]

Shimada

[11] Patent Number: 5,234,272
[45] Date of Patent: Aug. 10, 1993

[54] ROLLER BEARING

[75] Inventor: Yukio Shimada, Fukui, Japan

[73] Assignee: Matsuura Machinery Corporation, Fukui, Japan

[21] Appl. No.: 909,243

[22] Filed: Jul. 6, 1992

[30] Foreign Application Priority Data

Jul. 10, 1991 [JP] Japan .................. 3-169785
Oct. 30, 1991 [JP] Japan .................. 3-285184

[51] Int. Cl.$^5$ ............................................. F16C 33/58
[52] U.S. Cl. ............................ 384/564; 384/450; 384/565
[58] Field of Search ............... 384/564, 450, 565, 569, 384/513, 515

[56] References Cited

U.S. PATENT DOCUMENTS

| | | | |
|---|---|---|---|
| 2,540,548 | 2/1951 | Rolph | 384/564 |
| 3,248,155 | 4/1966 | Schaeffler | 384/564 |
| 3,253,869 | 5/1966 | Smith | 384/564 |
| 5,062,719 | 11/1991 | Bauer et al. | 384/450 |

*Primary Examiner*—Lenard A. Footland
*Attorney, Agent, or Firm*—Jordan and Hamburg

[57] ABSTRACT

A plurality of rollers 4 are arranged between the inner and outer races 2 and 3 so that the distances between the rollers can be freely changed without a retainer. Since there is no retainer, any abrasion of the retainer due to the frictions between the rollers and the retainer is not caused, the number of the rollers can be increased, and the carrying capacity can be increased so that the roller hearing with a longer life time can be obtained.

10 Claims, 9 Drawing Sheets

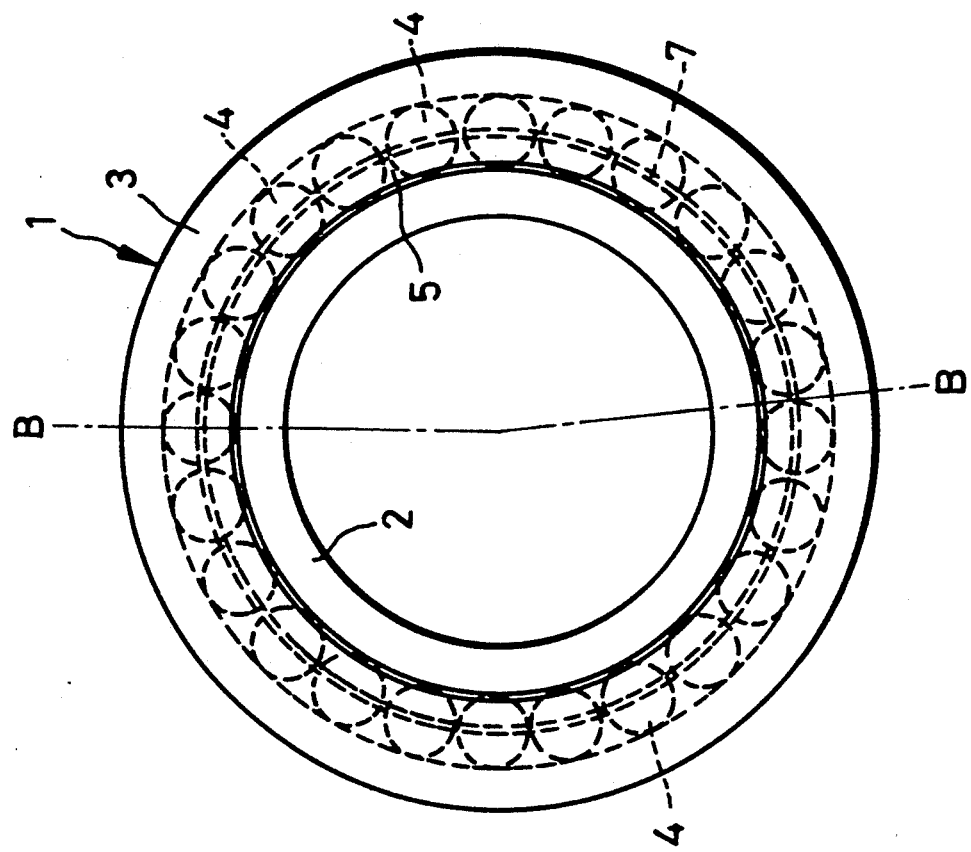
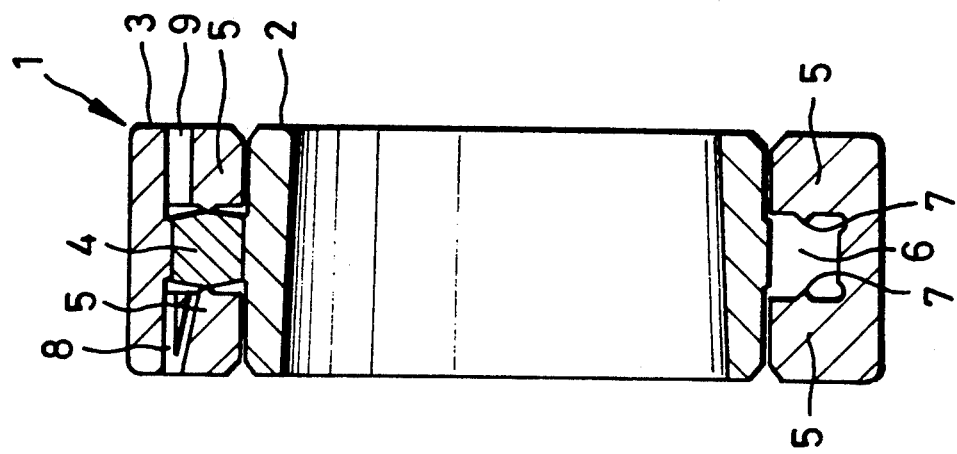

ROLLER BEARING

BACKGROUND OF THE INVENTION

1. Field of the Invention

The present invention relates to a roller bearing in which a roller is used as a rolling body to support a shaft of rotation and smoothly rotate the shaft under a load acting thereon.

2. Description of the Prior Art

As shown in FIGS. 13 to 15, the roller bearing, which has hitherto been used, is formed at any one of an outer race 51 and an inner race 52—in FIG. 13 at the inner race 52 and in FIG. 15 at the outer race 51—with flanges 53, in the region of which a plurality of rollers 54 are accommodated and interposed between the outer race 51 and the inner race 52. This construction prevents the rollers 54 from shifting in the direction of axis with respect to the inner race or outer race, and from falling down when the axis of the shaft is used vertically. The plurality of rollers 54 are retained at predetermined distances in the peripheral direction of the inner race by a retainer 55 (FIG. 14).

The retainer 55 is provided with a plurality of frames distributed at equal distances in the peripheral direction. Since the rollers 54 each are retained in each of the frames, when the rollers 54 are moved in rolling motion, contact frictions are inevitably caused between the rollers 54 and the retainer 55 and between the retainer 55 and the outer and inner races 51, 52, and the abrasion due to such frictions results in earlier damage of the retainer and seizure of the bearing.

Furthermore, since each roller 54 is retained by the retainer 55, the existence of the retainer reduces a free space between the inner and outer races 52 and 55, and the design of the flanges 53 supporting the rollers is limited.

If the flanges 53 are lower in height, the rollers 54 come into contact with the flanges 53 in the vicinity of the periphery of the rollers. The contact of the rollers 54 with the flanges in the vicinity of the periphery thereof inevitably causes greater contact frictions between the rollers 54 and the flanges 53 due to the rotation of the rollers and the revolution thereof relative to the outer and inner races. In addition to the contact with the flanges, the rollers are also brought into contact with the retainer 55, which results in abrasion of the rollers, retainer and the outer race or inner race.

SUMMARY OF THE INVENTION

An object of the invention is to dissolve the above-mentioned prior art problems and provide a roller bearing which has less contact friction portions of the roller.

Another object of the invention is to provide a roller bearing which is not provided with any retainer and capable of being freely changed in the distance between the rollers, and accordingly in which more rollers than the prior art can be inserted and which has a greater carrying capacity.

A further object of the invention is to provide a roller bearing which enables the height of the flanges provided in the inner race or the outer race to make greater and which enables the track surfaces of the outer and inner races to be positively and simply supplied with lubricating oil to thereby avoid rapid seizure of the bearing due to the lack of oil film and restrain the generation of heat during the operation.

In order to achieve the above-mentioned object, the invention provides a roller bearing having an inner race, an outer race and a plurality of rollers which roll on the track of the inner race and that of the outer race, characterized in that the rollers are arranged so that the relative distances between the adjacent rollers can be freely changed relative to each other, and the sum of the clearances between the rollers arranged in a row is made to a value lower than a predetermined amount.

The above-mentioned predetermined amount is what is determined inductively. For example, with an outer diameter of the inner race $D_i=43$ mm, an inner diameter of the outer race $D_o=55$ mm, a roller pitch circle diameter $D_m=49$ mm and a diameter of each roller $d=6$ mm, the predetermined amount corresponds to approximately an amount of three rollers, as apparent from a test relating to FIG. 11 as stated below. When determining the above-mentioned amount from various sizes of roller bearings, it is defined by $$0.2 \times 180/\cos^{-1}\{(D_m^2-d^2/2)D_m^2\}.$$

In the present invention, no conventional retainers are used and only a plurality of rollers are arranged and accommodated between the inner and outer races so as to be capable of being changed in relative distances from each other. The configuration of the roller is defined as occasion demands and generally cylindrical or conical. Since the retainer does not exist, no damage due to the frictions between the rollers and the retainer is naturally given to the rollers as in the conventional roller bearings. Notwithstanding that no retainer exists, the rollers are dispersed at equal distances between the outer and inner races due to a balancing action, following the rotation of the outer race or that of the inner race. That is to say, the effect of retaining the relative distances is provided similarly as if the retainer were used. No use of the retainer permits the number of the rollers to be increased as compared with the conventional roller bearing, and therefore the carrying capacity of the entire roller bearing to be also increased.

Since the rollers are not always in contact with each other and, even when in contact, only come in a state of line of contact except a case where the rollers are arranged without any distances from each other, an influence due to frictions is less as compared with the surface of contact between the rollers and the retainer as in the conventional roller bearing.

BRIEF DESCRIPTION OF THE DRAWINGS

FIG. 3 is a sectional view of a further embodiment corresponding to FIG. 1 taken along line B—B of FIG. 4;

FIG. 4 is a side view as perceived from the right side of the roller bearing in FIG. 3;

DETAILED DESCRIPTION OF PREFERRED EMBODIMENTS

The invention will be explained about embodiments in detail with reference to the drawings.

Figure 2:
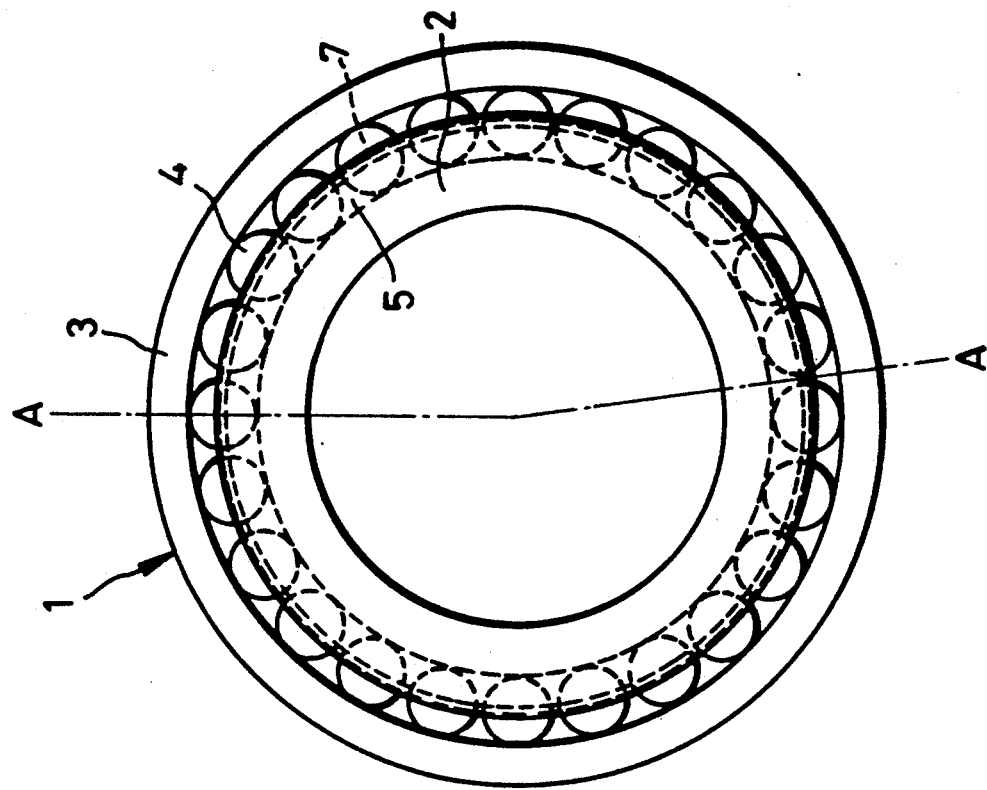
FIG. 2 is a side view as perceived from the right side of the roller bearing in FIG. 1.
Figure 1:
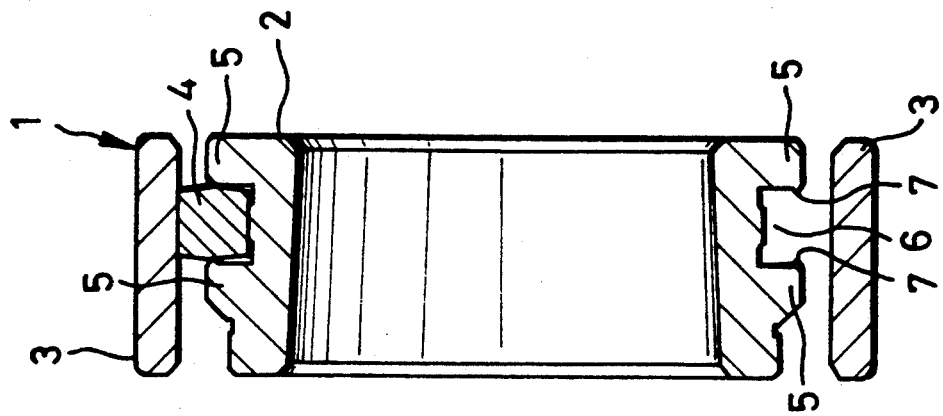
FIG. 1 is a sectional view of a roller bearing according to the invention taken along line A—A of FIG. 2.

Referring to FIGS. 1 and 2, a roller bearing 1 comprises an inner race 2, an outer race 3 and a plurality of rollers 4. As viewed in FIG. 1, the inner race 2 is formed in the outer peripheral surface with annular flanges 5 in two rows and is further formed with an annular groove 6 interposed between the annular flanges 5. A plurality of rollers 4 are accommodated within the annular grooves 6 in an arrangement of a row so as not to slide fundamentally. Alternatively, the annular flanges may be arranged in three and more rows to thereby form a plurality of annular grooves.

Each of the flanges 5 is formed with an annular projection 7 extending towards the rollers 4 and is in contact with approximately a center of the surface of each of the rollers 4 facing the projection. The contact area of the contact portion between the roller 4 and the projection 7 is not particularly defined. If the end surface of the roller 4 which is in contact with the projection 7 is a plane, the roller 4 comes in contact with the annular projection 7 in a line of contact, while if the end surface of the roller 4 is formed as a surface convex at the center, the roller comes in contact with the projection 7 in a point of contact at the center of the end surface. This remarkably reduces the abrasion of the rollers at the contact portion with the projection 7 due to the revolution of the roller with respect to the inner race and also the abrasion of the rollers due to the rotation thereof.

Referring to FIG. 1, the inner surface of the outer race 3 which is in contact with the roller 4 is formed as a smooth linear peripheral surface. If the outer race is formed with an annular groove, the inner race is formed in a similar manner as stated and comes in contact with the rollers.

In a case where the flanges 5 are constructed in height greater than the conventional ones because of no existence of the retainer, the peripheral speed of rotation of the flanges and that of revolution of the flanges at the contact portion with the rollers become greater than that of the conventional ones, while the point of contact of the projection with the rollers brought about a peripheral speed of rotation of zero at the contact portion of the flanges with the rollers and a smaller contact area at the time of revolution and makes it possible to reduce the frictions of contact.

FIGS. 3 and 4 illustrate an embodiment of a roller bearing in which an outer race 3 is formed with an annular groove 6 interposed between flanges 5 and rollers 4 are accommodated within the annular groove 6.

The flanges 5 are formed at a height corresponding to substantially the total height of the roller 4. The flanges 5 each are provided substantially at the central portion thereof with an annular projection 7 extending towards the rollers 4 so as to come in contact with the center of the surface of the rollers 4.

Each of the both end surfaces of the roller 4, which comes in contact with the projection 7, is formed as a surface convex at the center and is in contact with the projection 7 at the center of the surface to thereby reduce the frictions of contact therebetween.

Each of the end surfaces which comes in contact with the annular projection may be a planer surface, but taking the friction with the projection into consideration, it has preferably a configuration extending towards the annular projection at the central portion as stated above, for example, a conical one may be raised. A convex spherical surface as a modification thereof is shown in FIG. 5.

Figure 5:
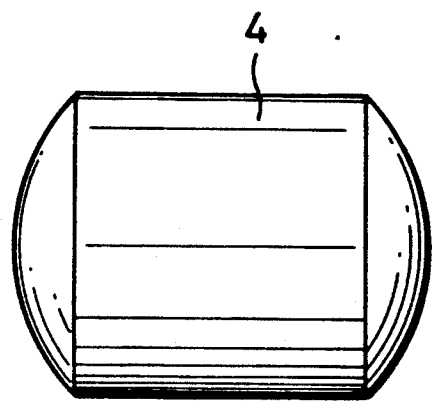
FIG. 5 is a view illustrating a modified embodiment of a roller.
Figure 6:
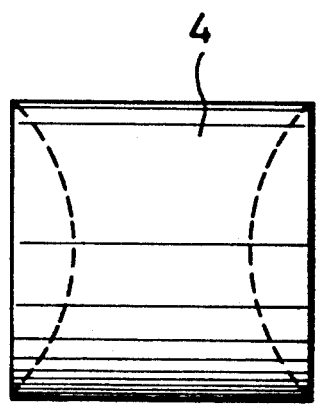
FIG. 6 is a view illustrating a further modified embodiment of a roller.

Each of the end surfaces in question include a concave spherical surface as shown in FIG. 6 and may be formed so as to have a desired geometrical configuration, for example, each of the end surfaces in question is fundamentally formed as a planar surface to which an annular projection 4a having the center of rotation of the roller as a center is added. The closer the radius of the projection 4a is to zero, the more it approximates to the convex spherical surface shown in FIG. 5, and the closer the radius of the projection is to the diameter of the roller 4, the more it approximates to the concave spherical surface shown in FIG. 6. In selecting the configuration of the end surfaces, it is necessary to consider both the stability of rolling of the rollers and the abrasion due to the contact thereof during the rotation at a high speed.

Figure 7:
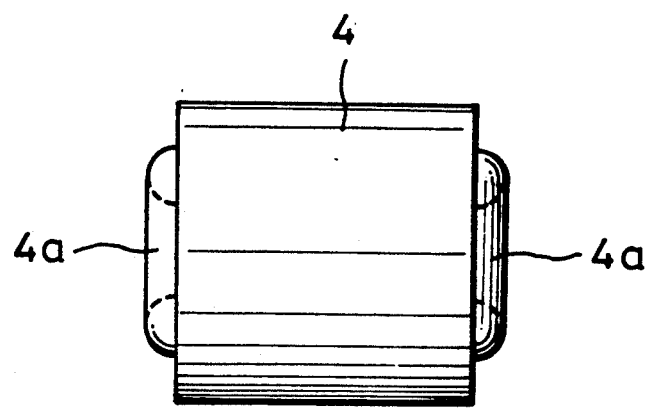
FIG. 7 is a view illustrating a still further modified embodiment of a roller.
Figure 8:
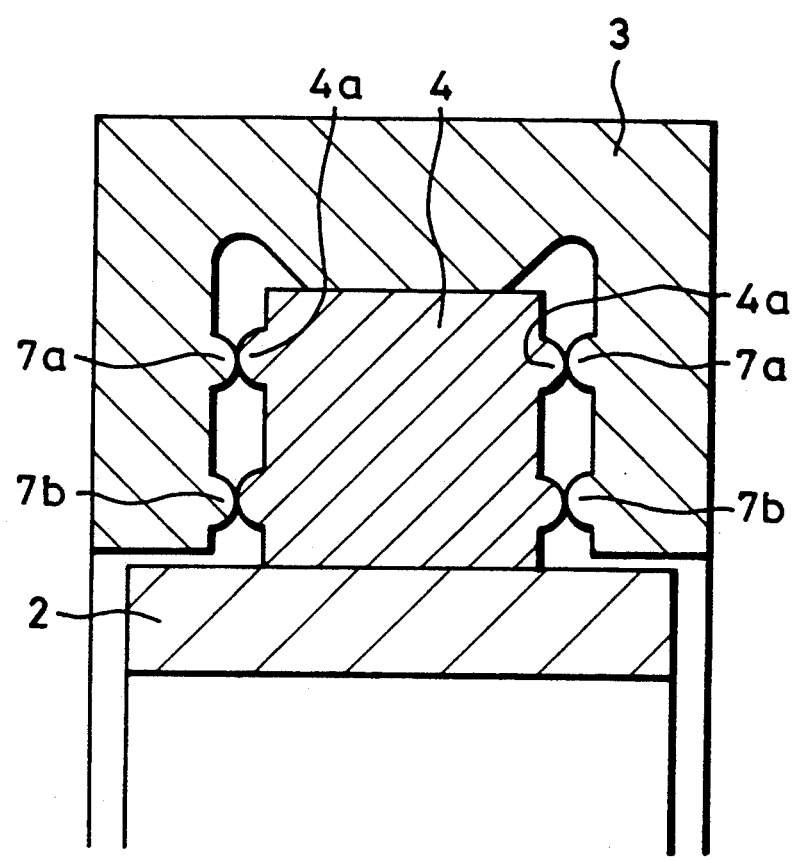
FIG. 8 is a partial sectional view of a roller bearing in which the rollers shown in FIG. 7 are used.

In a case where the rollers 4 in FIG. 7 formed with the annular projections 4a on both end surfaces thereof are used, flanges 5 of the outer race 3, when provided with a annular groove, are formed with two concentric annular projections 7a, 7b arranged so as to come in abutting engagement with the projections 4a.

The roller having the end surfaces formed in simple curved surfaces such as the convex spherical surface shown in FIG. 5 and the concave spherical surface shown in FIG. 6 is most preferably in abutting engagement with the annular projection 7 of the flanges 5 at the center thereof, however it is not indispensable. The annular projection 7 may be positioned so that it comes in abutting engagement with the end surfaces of the roller in an arbitrary position thereof out of the center.

For example, in a case where the outer race 3 is fixedly mounted and the inner race 2 is mounted on a rotary shaft, each of the annular projections 7 is set in a position closest to the inner periphery of each of the flanges 5 provided in the outer race 3 so that it may be brought into contact with the rollers 4 in the vicinity of the outer periphery thereof. In this case, the rollers 4 are in contact with the annular projection 7 in the vicinity of the outer periphery thereof where the relative speed of the rollers 4 with respect to the outer race 3 is the lowest, and therefore if the peripheral speed of the rotation of the rollers 4 and that of the revolution thereof are made so as to synchronize with each other, an influence on the frictions of contact can be minimized and any twist of the rollers can be avoided.

The annular groove 6 can be deepened until it reaches substantially the entire height of the roller 4. Accordingly, if the flanges 5 are thickened in the axial direction together with the deepened annular groove, it facilitates to form suitably a hole 8 for supplying lubricating oil and a discharging hole 9 in the ring having the groove. As a result, a roller bearing having a remarkably better lubricating property is obtained as compared with the construction of the conventional roller bearing in which lubricating oil is injected from a position somewhat away from the rollers. Preferably, the holes 8 for supplying lubricating oil are provided in the construction in FIG. 9 so that lubricating oil can be supplied to a position where the rollers come in contact with the inner race 2, a position where the rollers come in contact with the outer race 3 and a position where the rollers come in contact with the annular projections 7. The respective holes can be provided in one of the flanges 5 or both of the flanges 5.

Also in FIG. 3, the holes 8 for supplying lubricating oil and the discharging hole 9 are provided, however the points and number of arrangement of these holes may be changed in any manner within a range of the flanges 5 so long as an allowable strength is not exceeded.

Figure 10:
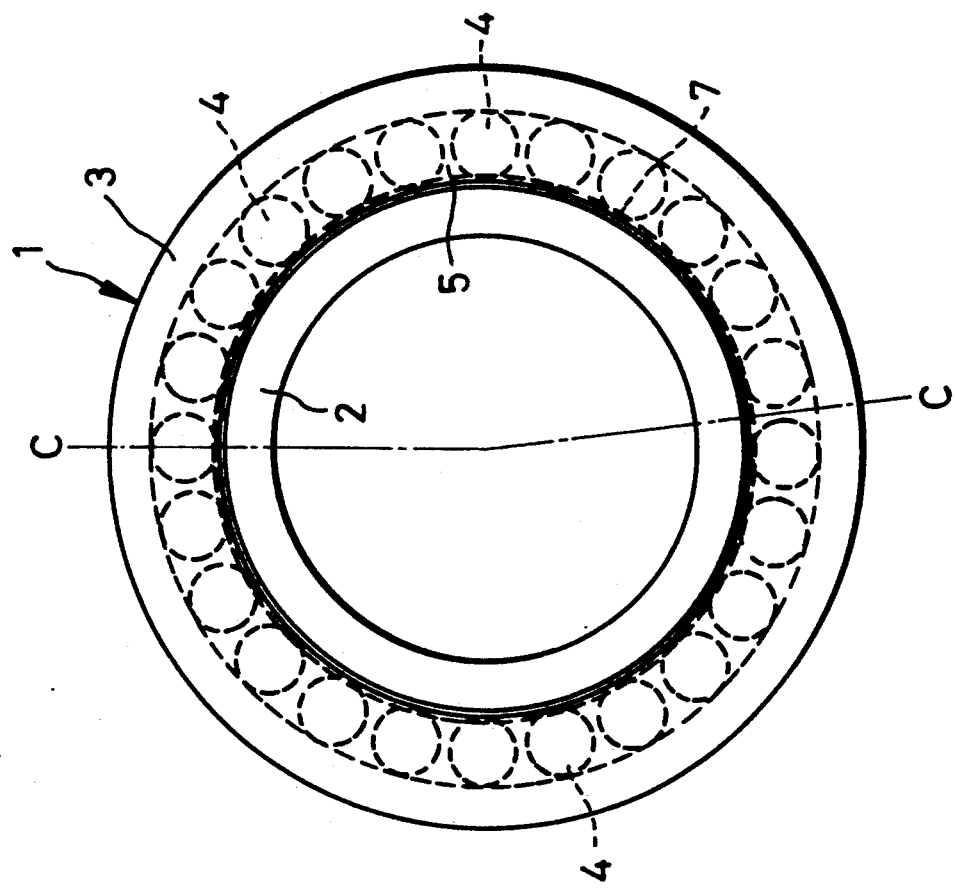
FIG. 10 is a side view as perceived from the right side of the roller bearing in FIG. 9.
Figure 9:
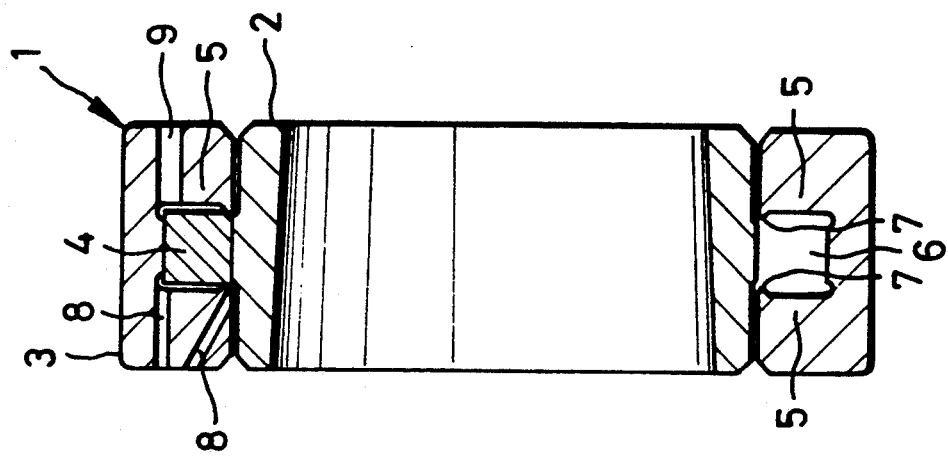
FIG. 9 is a sectional view of a further embodiment of a roller bearing according to the invention taken along line C—C of FIG. 10.

In FIGS. 9 and 10, since the parts or portions corresponding to those in FIGS. 3 and 4 are affixed by the same reference numerals as those in FIGS. 3 and 4, any explanation other than the above-mentioned one is omitted.

The above-mentioned roller bearings can be formed utilizing the inner races, outer races and rollers of a cylindrical roller bearing and a conical roller bearing hitherto defined in JIS (Japanes Industrial Standard), and can be manufactured using the manufactured inner race, outer race and rollers. The ratio of roller width to roller diameter, that is, B/D is lower than 1.

Since the roller bearing according to the invention does not include the conventional retainer, nothing restrains the relationship between the rollers and the relative distances therebetween can be freely changed. In other words, the number of the rollers and the distances therebetween can be arbitrarily selected, and while the conventional roller bearings are restrained in the number of the rollers and the distances therebetween by the retainer, the roller bearings according to the invention permits the rollers more than those in the conventional ones to be mounted so that the carrying capacity can be increased.

For example, in a case where the peripheral length of the circumference passing through the center of each roller arranged between the inner and outer races is an integer multiple of the diameter of the roller, the rollers can be arranged without any distances therebetween and the carrying capacity in that case becomes the maximum. On the other hand, since the rollers are always in contact with each other, although in line of contact, they are problematic in a life time. In order to prevent a fall of life time due to the frictions, it is preferable to decrease one or more than one roller from the number of the rollers which can be accommodated exactly between the inner and outer races.

Figure 11:
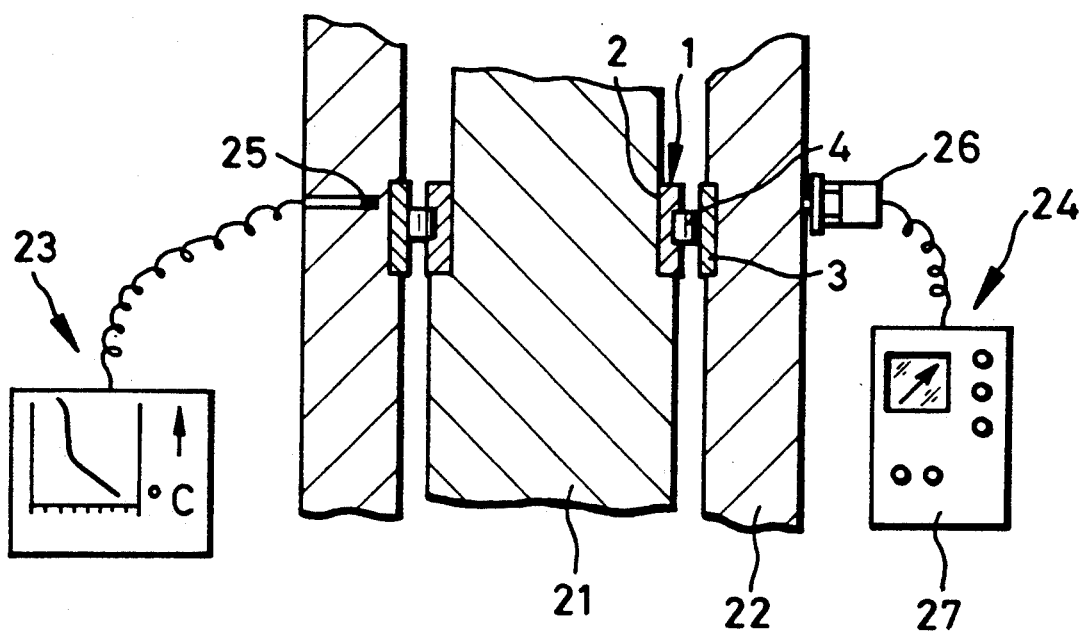
FIG. 11 is a fragmentary view of a portion of a testing machine.
Figure 12:
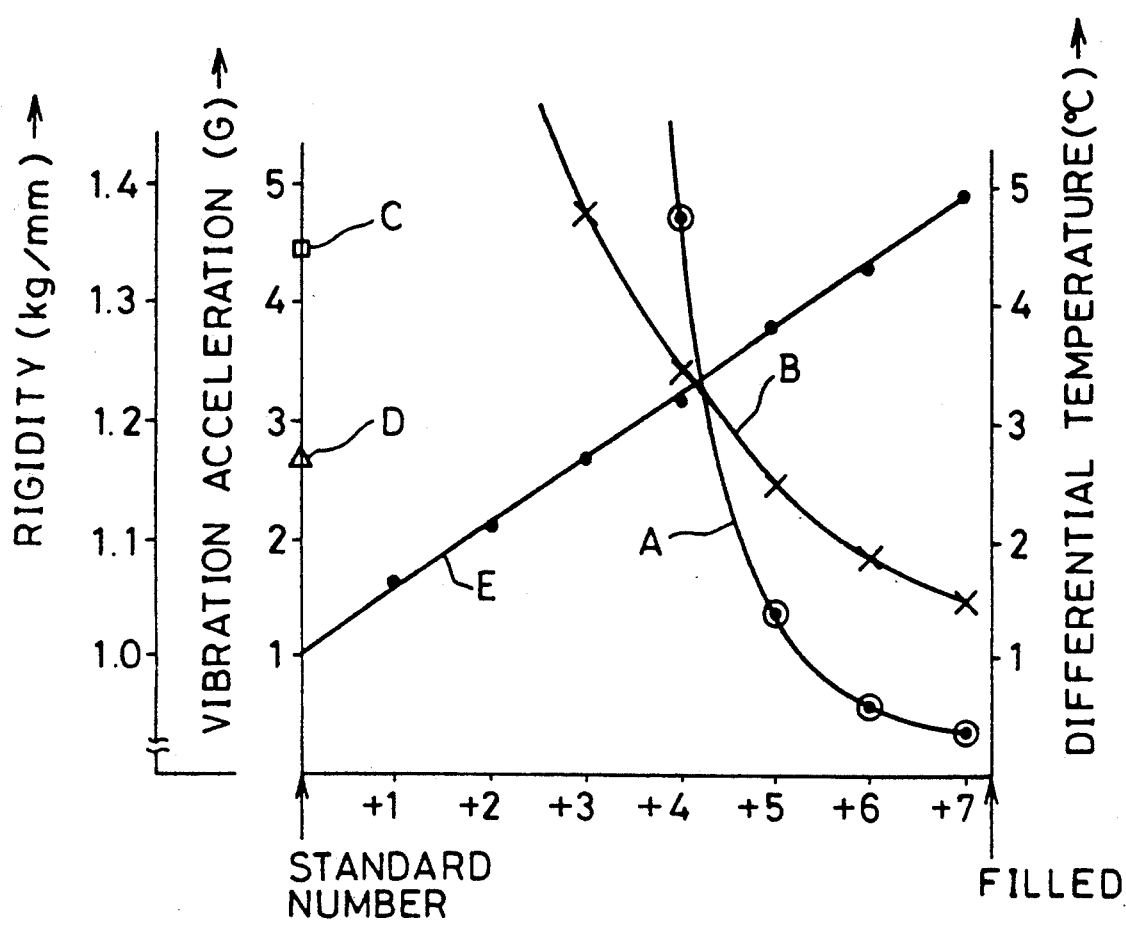
FIG. 12 is a graph showing the result of a test.
Figure 14:
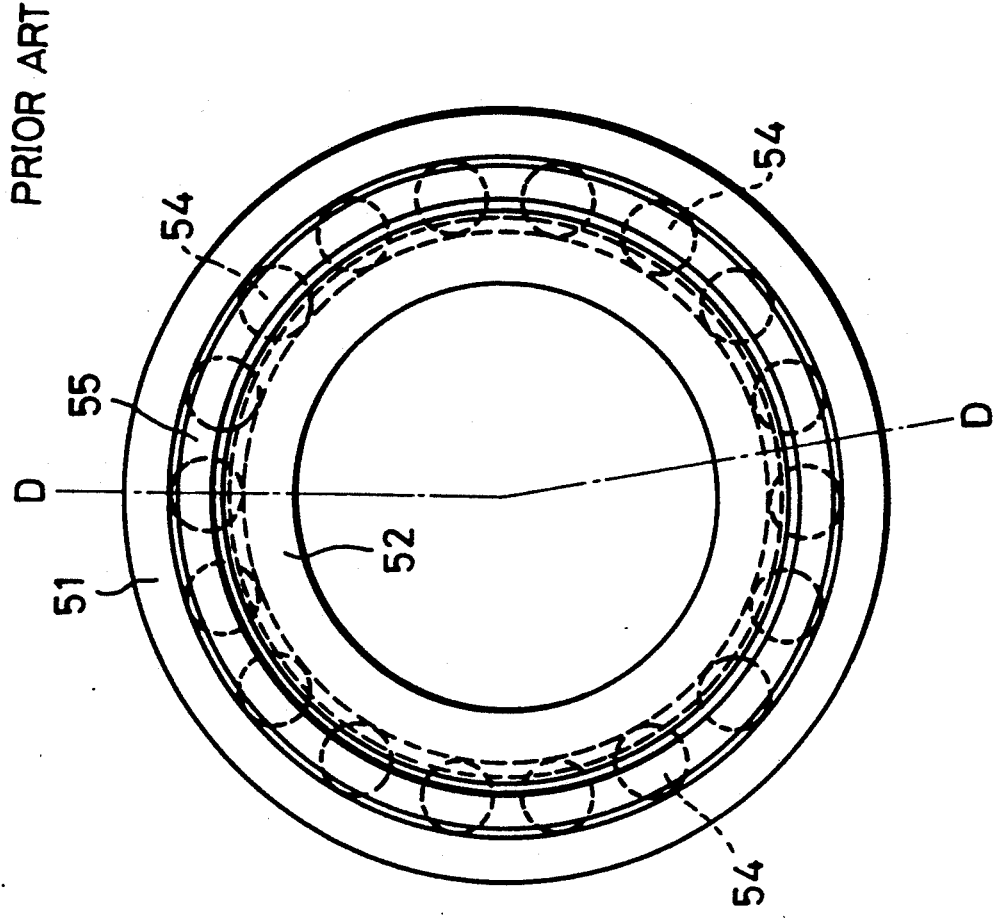
FIG. 14 is a side view as perceived from the right side of the roller bearing in FIG. 13.
Figure 13:
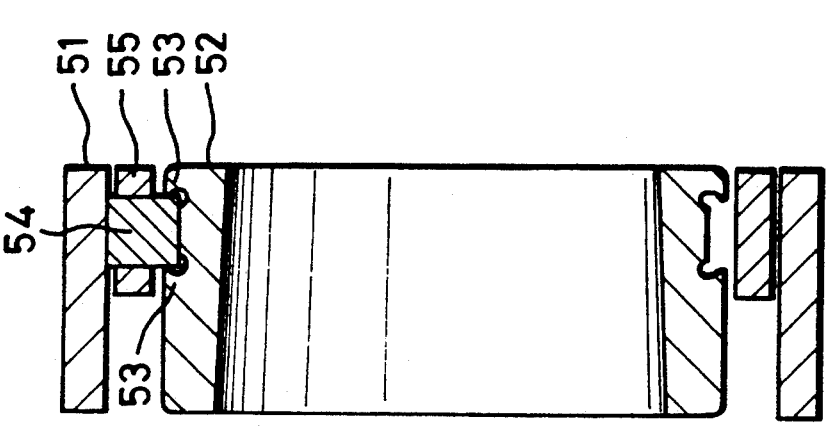
FIG. 13 is a sectional view of a conventional roller bearing taken along line D—D of FIG. 14.
Figure 15:
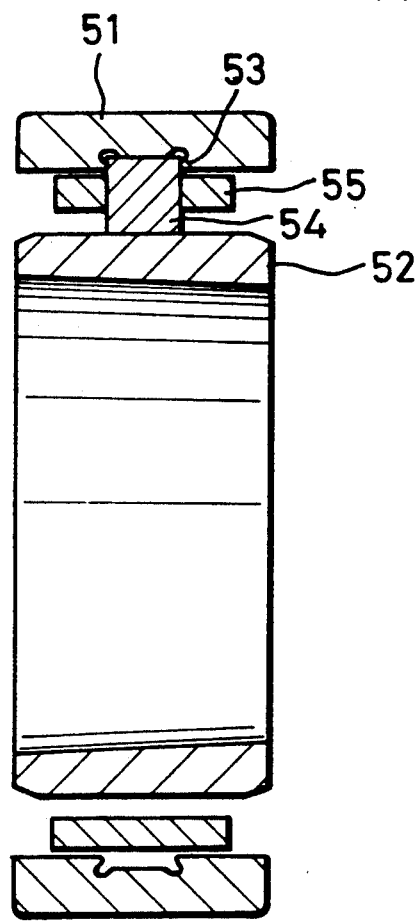
FIG. 15 is a sectional view of a further conventional roller bearing corresponding to FIG. 13.

As shown in FIG. 11, the roller bearing 1 was mounted by fitting the inner race 2 on a spindle 21 of a testing machine and the outer race 3 on a housing 22, and the shaft 21 was rotated and a test was carried out. The temperature of the outer race 3 was measured by a temperature measuring device 23 and the vibration by a vibration measuring device 24, and a result as shown in FIG. 12 was obtained. In the graph, the axis of ordinate designates the number and rigidity (kg/mm) of the rollers. The number of the rollers was designated by an increased number from a standard number when the conventional standard number thereof was set as 0. In this measuring experiment, when the rollers were arranged between the inner and outer races, there was such a relation that the peripheral length of the circumference passing through the centers of the rollers becomes an integer multiple of the diameter of the roller, and the maximum increased number from the standard number is 7, with each of the rollers being in close contact with each other. The axis of ordinate at the right side designates a differential temperature (°C.) of the roller bearing and that at the left side an acceleration of vibration (G). The curve A indicates vibration acceleration variation B differential temperature variation and E, which is straight line, rigidity variation, each against an axis of abscissas representing the number of rollers arranged and accommodated between the inner and outer races.

In the embodiment as shown in the drawing, the temperature measuring device 23 has a thermistor 25 as a temperature measuring part, and the vibration measuring device 24 has a acceleration pick up 26 and a vibrator 27.

It became clear that with a number of revolution of the spindle 21 of 20,000 rpm, a differential temperature, that is, a value of temperature rise in a conventional standard cylindrical bearing with a retainer was 4.5° C. as shown at a point C and a value of vibration acceleration was approximately 2.7 as shown at a point D, while in the roller bearing according to the invention, the more the number of the rollers was increased, the more the differential temperature was lowered as shown in the curve B. As for the vibration acceleration, it became clear that the more the number of the rollers increases, the more the vibration acceleration decreases.

As compared with the conventional standard roller bearing, the roller bearing according to the invention is effective in a case where the clearances between the rollers correspond to an amount of not more than three rollers.

When determining this from various sizes of roller bearings, the following table is obtained (the unit of dimension is designated by mm).

|  | $\phi D_1$ | $\phi D_o$ | $\phi D_m$ | $\phi d$ | Optimum Max. accmodation number of rollers |
|---|---|---|---|---|---|
| Ex. 1 | 43 | 55 | 49 | 6 | 25 |
| Ex. 2 | 36.5 | 48.5 | 42.5 | 6 | 22 |
| Ex. 3 | 53.5 | 67.5 | 60.5 | 7 | 27 |
| Ex. 4 | 58.5 | 72.5 | 65.5 | 7 | 29 |

|  | Standard number of rollers | Limiting reduced number of rollers |
|---|---|---|
| Ex. 1 | 18 | 3 |
| Ex. 2 | 16 | 3 |
| Ex. 3 | 19 | 4 |
| Ex. 4 | 20 | 5 |

The relation of the graph in FIG. 12 was introduced also in the Examples 2 to 4. If the predetermined amount which is the maximum limitation value of the sum of the clearances between the rollers is further derived inductively from these values of various sizes, it is as follows.

The peripheral length $S_d$ per roller at the maximum number of rollers which can be accommodated in the peripheral length $S_m = \pi D_m$ of a roller pitch circle diameter $D_m$ is designated by $$S_d = (S_m/180) \times \cos^{-1}\{(D_m^2/2 - d^2/4)/D_m^2/2\}$$
$$= (S_m/180) \times \cos^{-1}\{(D_m^2 - d^2/2)/D_m^2\}.$$

Accordingly, the theoretical accommodation number $Z_t$ of rollers of the roller bearing is given as follows.

$$Z_t = S_m/S_d = 180/\cos^{-1}\{(D_m^2 - d^2/2)/D_m^2\}$$

When $Z_t$ is an integer, each of the rollers comes in close contact with each other. In the case of the above-mentioned examples 1 to 4, the actual maximum accommodation number $Z$ of rollers is smaller than $Z_t$ and therefore, given as follows.

$$Z \leq 180/\cos^{-1}\{(D_m^2 - d^2/2)/D_m^2\}$$

When drawing, using the above-mentioned equation, the limiting reduced number of rollers which enables the more advantageous condition in point of the differential temperature and vibration acceleration than that of the conventional standard bearing to be maintained even if the number of rollers is reduced from the maximum accommodation number of rollers, the above-mentioned predetermined amount is defined by $$0.2 \times 180/\cos^{-1}\{(D_m^2 - d^2/2)/D_m^2\}$$

In the roller bearing according to the invention, a number of rollers are accommodated so that the distances therebetween can be freely changed, however when a relative rotation exists between the inner and outer races, it operates to balance entirely the rollers, which causes the rollers to be dispersed so as to make the distances therebetween uniform. Consequently, the occurrence of contact of the rollers is prevented so long as the rollers are not accommodated in close contact with each other, and that the relative distances between the rollers are retained similarly just as the retainer is used.

When the entire accommodation number of the rollers was accommodated in complete contact with each other, it is most preferable in view of temperature and vibration and provides a longer life time that the number of the rollers was less by one than the maximum accommodation number thereof.

What is claimed is:

1. A roller bearing comprising an inner race, an outer race and a plurality of rollers which roll on the track of the inner race and that of the outer race, characterized in that each of the rollers is arranged so that the relative distances therebetween can be freely changed, and the sum of the clearances between the rollers arranged in a row is lower than a predetermined amount.

2. A roller bearing as claimed in claim 1, characterized in that one of the inner and outer races is formed with an annular groove interposed by flanges, said rollers being accommodated in said annular groove, and annular projections which are brought into contact with the rollers in the vicinity of the center at both ends thereof are formed on said flanges.

3. A roller bearing as claimed in claim 2, characterized in that the height of said flanges is substantially equal to that of said rollers, and at least one of said flanges is provided with a supplying hole for supplying lubricating oil towards the contact portions between the rollers and the inner and outer races.

4. A roller bearing as claimed in claim 2, characterized in that the roller is formed at both of the end surfaces with annular projecting portions having the center of rotation of the rollers as a center, and each of said flanges is formed with annular projections which come in abutting engagement with said annular projecting portions.

5. A roller bearing as claimed in claim 1, characterized in that the stationary outer race is formed with an annular groove interposed by flanges, said rollers being accommodated in said annular groove, and said flanges each being formed with an annular projection at a region closest to the inner periphery of the flange and in a position where it comes in contact with the rollers in the vicinity of the outer periphery thereof.

6. A roller bearing as claimed in claim 5, characterized in that, at least one of said flanges is provided with a supplying hole for supplying lubricating oil towards the contact portions between the rollers and inner and outer races.

7. A roller bearing as claimed in claim 1, characterized in that both of the end surfaces of the rollers are formed in concave spherical surfaces.

8. A roller bearing as claimed in claim 1, characterized in that both of the end surfaces of the rollers are formed in three dimensional curved surfaces.

9. A roller bearing as claimed in claim 1, characterized in that both of the end surfaces of the rollers are formed in conical surfaces.

10. A roller bearing as claimed in claim 1, characterized in that both of the end surfaces of the rollers are formed in convex spherical surfaces.

* * * * *